(12) United States Patent
Azar et al.

(10) Patent No.: US 12,187,026 B2
(45) Date of Patent: Jan. 7, 2025

(54) APPARATUS FOR COATING A SURFACE WITH INDIVIDUAL PARTICLES

(71) Applicant: LANDA LABS (2012) LTD., Rehovot (IL)

(72) Inventors: Sasy Azar, Mazkeret Batya (IL); Benzion Landa, Nes Ziona (IL); Yosef Shachak, Kfar Saba (IL); Nir Rubin Ben Haim, Hod Hasharon (IL)

(73) Assignee: LANDA LABS (2012) LTD., Rehovot (IL)

( * ) Notice: Subject to any disclaimer, the term of this patent is extended or adjusted under 35 U.S.C. 154(b) by 67 days.

(21) Appl. No.: 17/910,092

(22) Filed: Sep. 8, 2022

(65) Prior Publication Data
US 2024/0165981 A1    May 23, 2024

Related U.S. Application Data

(63) Continuation-in-part of application No. PCT/IB2021/052775, filed on Apr. 2, 2021.

(30) Foreign Application Priority Data

Apr. 7, 2020  (GB) .................................. 2005159.5
Dec. 30, 2020 (GB) .................................. 2020721.3

(51) Int. Cl.
*B05C 19/04*       (2006.01)
*B05B 1/26*        (2006.01)
(Continued)

(52) U.S. Cl.
CPC .............. *B41F 13/22* (2013.01); *B05B 1/265* (2013.01); *B05B 7/1486* (2013.01); *B05B 14/10* (2018.02);
(Continued)

(58) Field of Classification Search
CPC ....... B05B 1/265; B05B 14/10; B05B 7/2486; B05B 11/025; B41M 5/03; G01N 15/075;
(Continued)

(56) References Cited

U.S. PATENT DOCUMENTS 4,608,942 A    9/1986  Hayashi
5,083,710 A *  1/1992  McLoughlin ........... B05C 19/04
                                              406/106
(Continued)

FOREIGN PATENT DOCUMENTS

CN      110196544      9/2009
DE      1907157        8/1998
(Continued)

*Primary Examiner* — Christopher E Mahoney
*Assistant Examiner* — Marissa Ferguson-Samreth
(74) *Attorney, Agent, or Firm* — Shalom Wertsberger; Saltamar Innovations

(57) ABSTRACT

The disclosure relates to a coating apparatus for applying a monolayer layer of particles to a receiving surface. The apparatus comprises a pressurized air source, an application chamber partially bounded by the receiving surface into which an air stream is delivered by the air source, an air return path for returning air from the application chamber to an intake of the air source to form an air circulation loop, and a dosing device for introducing particles to be coated onto the receiving surface into the air circulation loop, a particle deflector being positioned in the path of the air stream to break up agglomerated particles carried by the air stream prior to coating the receiving surface with the particles. A method of applying a layer of particles is also provided, as well as printing systems benefiting from the present coating apparatus.

19 Claims, 4 Drawing Sheets

(51) Int. Cl.
*B05B 7/14* (2006.01)
*B05B 14/10* (2018.01)
*B05C 5/02* (2006.01)
*B05C 11/02* (2006.01)
*B05C 19/00* (2006.01)
*B41F 13/193* (2006.01)
*B41F 13/22* (2006.01)
*B41M 5/03* (2006.01)
*G01N 15/075* (2024.01)

(52) U.S. Cl.
CPC .......... *B05C 5/0245* (2013.01); *B05C 11/025* (2013.01); *B05C 19/008* (2013.01); *B05C 19/04* (2013.01); *B41F 13/193* (2013.01); *B41M 5/03* (2013.01); *G01N 15/075* (2024.01)

(58) Field of Classification Search
CPC ........ B05C 19/04; B41F 13/193; B41F 13/22; B41C 5/0245; B41C 11/025; B41C 19/008
See application file for complete search history.

(56) References Cited

U.S. PATENT DOCUMENTS

| | | |
|---|---|---|
| 10,336,059 B2 | 7/2019 | Landa et al. |
| 10,913,835 B2 | 2/2021 | Landa et al. |
| 10,960,432 B2 | 3/2021 | Landa et al. |
| 11,104,779 B2 | 8/2021 | Landa et al. |
| 11,312,168 B2 | 4/2022 | Landa et al. |
| 2014/0251386 A1 | 9/2014 | Sasaki et al. |
| 2020/0356521 A1* | 11/2020 | Kessler ............... G06F 13/4291 |

FOREIGN PATENT DOCUMENTS

| | | | |
|---|---|---|---|
| DE | 19707157 | 8/1998 | |
| GB | 712437 | 7/1954 | |
| KR | 102180866 | 11/2020 | |
| WO | WO 2014/109702 | 7/2014 | |
| WO | WO 2016/189511 | 12/2016 | |
| WO | WO 2016/189513 | 12/2016 | |
| WO | WO 2018/100530 | 6/2018 | |
| WO | WO-2018100541 A1 * | 6/2018 | ............ B41J 2/0057 |
| WO | WO 2019/050973 | 3/2019 | |
| WO | WO 2019/234597 | 12/2019 | |
| WO | WO 2021/205304 | 10/2021 | |

* cited by examiner

APPARATUS FOR COATING A SURFACE WITH INDIVIDUAL PARTICLES

CROSS-REFERENCE TO RELATED APPLICATIONS

This application is a Continuation-in-Part of International Application No. PCT/IB2021/052774, filed on Apr. 2, 2021, which claims Paris Convention priority from Great-Britain application No. 2005159.5, filed on Apr. 7, 2020, and from Great-Britain application No. 2020721.3, filed on Dec. 30, 2020. This application is also related to International Application No. PCT/IB2021/052774 titled "Apparatus For Coating a Surface With Particles". The entire disclosures of all of the aforementioned applications are incorporated herein by reference for all purposes as if fully set forth herein.

FIELD

The present disclosure relates to an apparatus for coating a receiving surface with individual particles.

BACKGROUND

In certain types of printing, a film supported by a carrier is transferred to a substrate (e.g., paper, cardboard, plastic films etc.) by application of pressure and/or heat in a desired pattern. One example of this is found in thermal transfer typewriters, where a ribbon carries an ink film that is transferred to paper by the application of heat.

A problem in using a conventional film coated carrier, be it a sheet, a web or a ribbon, is that the process is wasteful, and therefore expensive. This is because, at the time that it has to be discarded, only a small proportion of the film coating will have been used (e.g., for printing a text) and most of the film coating will remain on the carrier.

In WO2016/189512, the present Applicant disclosed a printing apparatus capable of mitigating the foregoing disadvantage. FIG. 1 of the latter publication is reproduced herein as FIG. 1 of the accompanying drawings and will now be described briefly.

FIG. 1 shows an endless intermediate transfer member (ITM) having an outer surface 12 serving as an imaging surface 12. The ITM is described in WO2016/189512 as being a drum 10 but it may alternatively be an endless belt. As the drum 10 rotates clockwise, as represented by an arrow, it passes beneath a coating apparatus, or particle dispenser, 14 where it acquires a coating of fine particles, the dispenser being suitably configured for the particles to form a monolayer downstream of the coating apparatus, if so desired. In the illustrative example of WO2016/189512, after exiting the coating apparatus 14, the imaging surface 12 passes beneath an imaging station 16 where selected regions of the imaging surface 12 are exposed to laser radiation, which renders the particle coating on the selected regions of the surface 12 tacky. Next, the surface 12 passes through an impression, or transfer, station 18 where a printing substrate 20 is compressed between the drum 10 and an impression cylinder 22. This causes the selected regions of the particle coating on the imaging surface 12 that have been rendered tacky by exposure to laser radiation in the imaging station 16 to transfer from the imaging surface 12 to the substrate 20. The regions on the imaging surface corresponding to the tacky areas transferred to the substrate consequently become exposed, being depleted by the transfer of particles. The imaging surface 12 can then complete its cycle by returning to the coating apparatus 14 where a fresh particle coating is applied only to the depleted regions from which the previously applied particles were transferred to the substrate 20 in the impression station 18.

Though the surface 12 is termed an imaging surface in the above-described printing system, it may alternatively be referred to as a donor surface 12 in any industrial application where the coated particles (or part thereof) end up being donated by (e.g., transferred from) the surface, and as far as the coating apparatus 14 is concerned it can also be referred herein as a receiving surface.

A comprehensive description of FIG. 1 is also to be found in WO2016/189513 which is concerned with the coating apparatus and only components of relevance to the present disclosure will be therefore discussed in greater detail below.

The present disclosure is in particular concerned with a coating apparatus that can be used to replace that described inter alia in WO2016/189513. It should be stressed, however, that the coating apparatus of the present disclosure may have other applications and is not restricted to use in an apparatus as described in WO2016/189512. For example, the manner in which selected regions become particle-depleted is immaterial to the present disclosure and, as an example, the transfer of particles to the substrate may alternatively be the result of an adhesive substance being applied to selected regions of the substrate or the result of heat being applied to the donor surface by means other than laser radiation and/or from a side either facing the coating of particles or beneath it (e.g., by a thermal print head located on the rear side of an ITM). Thus, in offset printing systems benefiting from a coating apparatus according to the present teachings, the imaging stations rendering the particles transferrable to a substrate can either be imaging stations applying energy to selected particles on the ITM or imaging stations selectively modifying regions of a substrate (e.g., by application of an adhesive), the modified regions being adapted to detach selected particles from the ITM in the corresponding regions.

The coating apparatus 14 in FIG. 1 comprises a plurality of spray heads 1401 that are aligned with each other along the axis of the ITM 10 and only one can therefore be seen in the section of the drawing. The sprays 1402 of the spray heads are confined within a bell housing 1403, of which the lower rim 1404 is shaped to conform closely to the donor surface 12 leaving only a narrow gap between the bell housing 1403 and the drum 10. The spray heads 1401 can be connected to a common supply rail 1405 which supplies to the spray heads 1401 a pressurized fluid carrier, typically air, having suspended within it the fine particles to be used in coating the donor surface 12. The surplus spray from the spray heads 1401, which is confined within a plenum 1406 formed by the inner space of the housing 1403, is extracted in the present illustration through an outlet pipe 1407, which is connected to a suitable suction source represented by an arrow, and can be recycled back to the spray heads 1401, if so desired.

It is important for the coating apparatus 14 to be able to achieve an effective seal between the housing 1403 and the donor surface 12, in order to prevent the spray fluid and the fine particles from escaping through the narrow gap that must essentially remain between the housing 1403 and the donor surface 12 of the drum 10. Different ways of achieving such a seal are shown schematically in FIG. 1.

The simplest form of seal is a wiper blade 1408. Such a seal makes physical contact with the donor surface and could score the applied coating if used on the exit side of the housing 1403, that is to say if used on the side downstream of the spray heads 1401. For this reason, if such a seal is used, it is preferred for it to be located only upstream of the spray heads 1401 and/or at the axial ends of the housing 1403. The terms "upstream" and "downstream" as used herein are referenced to points on the donor surface 12 as it passes through the coating apparatus.

FIG. 1 also shows how egress of the fluid within which the particles are suspended from the sealing gap between the housing 1403 and the drum 10 can be prevented without a member contacting the donor surface 12. A gallery 1409 extending in the present illustration around the entire circumference of the housing 1403 is connected by a set of fine passages 1410 extending around the entire rim of the housing 1403 to establish fluid communication between the gallery 1409 and the sealing gap.

The gallery 1409 is connected to a suction source of a surplus extraction system, which may be the same suction source as is connected to the outlet 1407 or a different one. In this case, the gallery 1409 serves to extract fluid passing through the gap before it exits the housing 1403. The low pressure may also suck off the drum 10 any particles that are not in direct contact with the donor surface 12.

WO2016/189513 also describes an embodiment in which the particles are applied to the donor surface by means of a rotating brush or roller interposed between the spray heads 1401 and the donor surface 12.

The reason that the coating apparatus 14 of WO2016/189513 only applies a monolayer of particles to the donor surface 12 is that the particles have a greater tendency to adhere to the donor surface than to one another. Hence, particles not in direct contact with the donor surface, can readily be dislodged and prevented from adhering to the donor surface, either by the action of brushes, or by suction, or by blowing away using an air knife like mechanism, or by a combination of such acts.

The coating apparatus 14 such as used inter alia in WO2016/189512, WO2018/100412, WO2018/100528, WO2018/100530, or WO2019/234597, needs to be capable of applying a monolayer of particles to an endlessly circulating donor surface of an ITM, ensuring that the donor surface leaves the coating apparatus with a uniform monolayer of particles, regardless of the proportion of the donor surface that may still retain a monolayer coating from a previous operating cycle upon arrival at the coating apparatus.

The rate at which particles need to be supplied to the coating apparatus will therefore vary with the extent of depletion of the coating at the transfer station 18 and it is an aim of the present disclosure to provide a coating apparatus capable of regulating the supply of particles in order to achieve reliable application of a uniform layer of particles to the donor surface regardless of the rate at which particles are transferred from the donor surface to a substrate.

SUMMARY

In accordance with a first aspect of the present disclosure, there is provided a coating apparatus for applying a layer of particles to a receiving surface, the apparatus comprising a source of pressurized air, an application chamber partially bounded by the receiving surface into which an air stream is delivered by the air source (e.g., through a nozzle), an air return path for returning air from the application chamber to an intake of the air source to form an air circulation loop, and a dosing device for introducing particles to be coated onto the receiving surface into the air circulation loop, wherein a particle deflector is positioned in the path of the air stream delivered through the nozzle, the deflector serving to break up agglomerated particles carried by the air stream prior to coating the receiving surface with the particles.

In some embodiments, the coating apparatus may further comprise brushes in the application chamber for brushing the receiving surface to leave only a single layer of particles adhering to the receiving surface, each of the brushes and the receiving surface being in relative movement one with the other. A first part of the brushes may be provided to lie adjacent to the nozzles and rotate in a direction to cause the bristles of the brushes adjacent to the nozzles to pass over the receiving surface in a same direction as the movement of the receiving surface. A second part of the brushes may be provided remote from the nozzles.

In some embodiments, at least one brush of the second part of the brushes is rotated in a direction to cause the bristles of said at least one brush remote from the nozzles to pass over the receiving surface in a direction opposite to the movement of the receiving surface.

If desired, a brush deflector may be provided adjacent at least one of the brushes to deflect tips of bristles prior to contact being made between the bristles and the receiving surface.

In accordance with a second aspect of the disclosure, there is provided a method of applying a layer of particles to a receiving surface, which method comprises providing an application chamber partially bounded by the receiving surface, blowing an air stream into the application chamber by means of an air source, returning air from the application chamber to an intake of the air source to form an air circulation loop, introducing into the air circulation loop particles to be coated onto the receiving surface, wherein a particle deflector is positioned in the path of the air stream, the deflector serving to break up agglomerated particles carried by the air stream prior to coating the receiving surface with the particles.

In some embodiments, the air stream is delivered (e.g., ejected) by the air source through a nozzle, the nozzle (or array of individual nozzles) extending across the entire width of the receiving surface.

In accordance with a third aspect of the disclosure, there is provided a printing apparatus including a coating apparatus for applying a layer of particles to a receiving surface, an imaging station for applying energy to selected regions on the receiving surface to render the particles coated thereon transferrable to a substrate, and an impression station at which only particles to which energy is applied in the imaging station are transferred from the receiving surface to a substrate to form an image on the substrate, wherein the coating apparatus comprising comprises a source of pressurized air, an application chamber partially bounded by the receiving surface into which an air stream is delivered by the air source, an air return path for returning air from the application chamber to an intake of the blower to form an air circulation loop, a dosing device for introducing particles to be coated onto the receiving surface into the air circulation loop, wherein a particle deflector is positioned in the path of the air stream delivered through the nozzle, the deflector serving to break up agglomerated particles carried by the air stream prior to coating the receiving surface with the particles.

When the coating apparatus is incorporated into a printing system, the receiving surface may be a recirculating receiving surface, which can also be referred to as an intermediate transfer member (ITM). In some embodiments, the recirculating receiving surface may be mounted on, or formed by the outer surface of, a rigid drum, such as depicted in FIG. 1, while in other embodiments, the recirculating receiving surface may be the outward surface of an endless flexible belt, such as schematically illustrated in FIGS. 10-12.

In particular embodiments, the layer of particles formed on the receiving surface of the coating apparatus or as a result of the coating method, whether or not further implemented in a printing apparatus or in a printing method, is a monolayer of particles. In another embodiment, the layer or the monolayer formed on the receiving surface or on the ITM is of particles in the sub-micrometer range.

These and additional benefits and features of the disclosure will be better understood with reference to the following detailed description taken in conjunction with the figures and non-limiting examples.

BRIEF DESCRIPTION OF THE DRAWINGS

Some embodiments of the disclosure will now be described further, by way of example, with reference to the accompanying figures, where like reference numerals or characters indicate corresponding or like components. The description, together with the figures, makes apparent to a person having ordinary skill in the art how some embodiments of the disclosure may be practiced. The figures are for the purpose of illustrative discussion and no attempt is made to show structural details of an embodiment in more detail than is necessary for a fundamental understanding of the disclosure. For the sake of clarity and convenience of presentation, some objects depicted in the figures are not necessarily shown to scale.

In the Figures.

DETAILED DESCRIPTION

Figure 1:
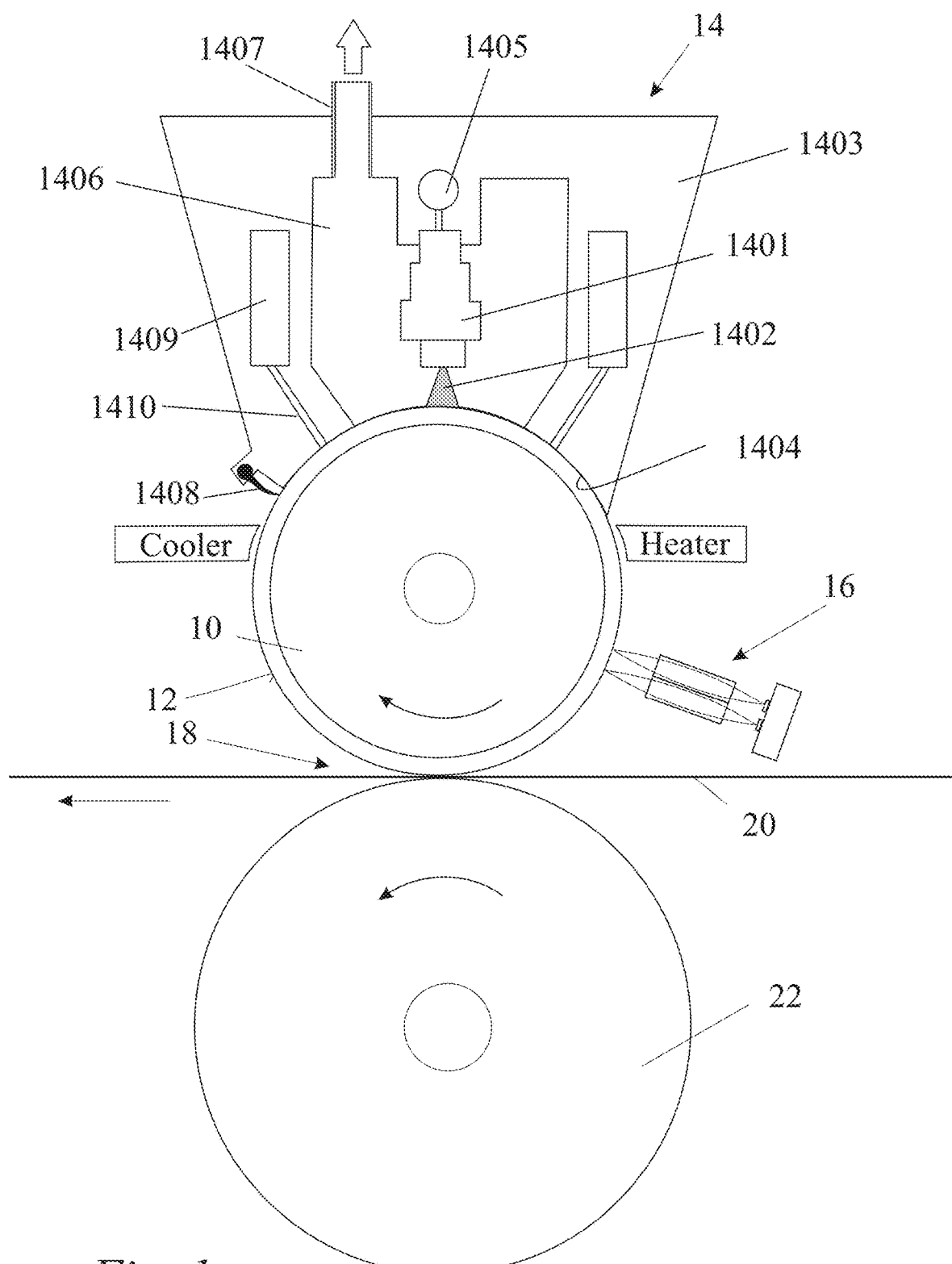
FIG. 1 shows, as earlier described, an apparatus known from WO2016/189512 for thermal transfer printing on a substrate.

FIG. 1, showing the prior art of WO2016/189513, has already been described above and need not therefore be described again. The particle dispenser or coating apparatus 102 shown in FIG. 2 serves the same function as the coating apparatus 14 in FIG. 1 but is intended for a printing system that employs a surface of a flexible endless belt 136 as the donor surface 108, in place of the rigid drum 10 of FIG. 1. According to some embodiments of the present teachings, it would alternatively be possible for the coating apparatus to coat a donor surface formed by the surface of a rigid drum.

Figure 2:
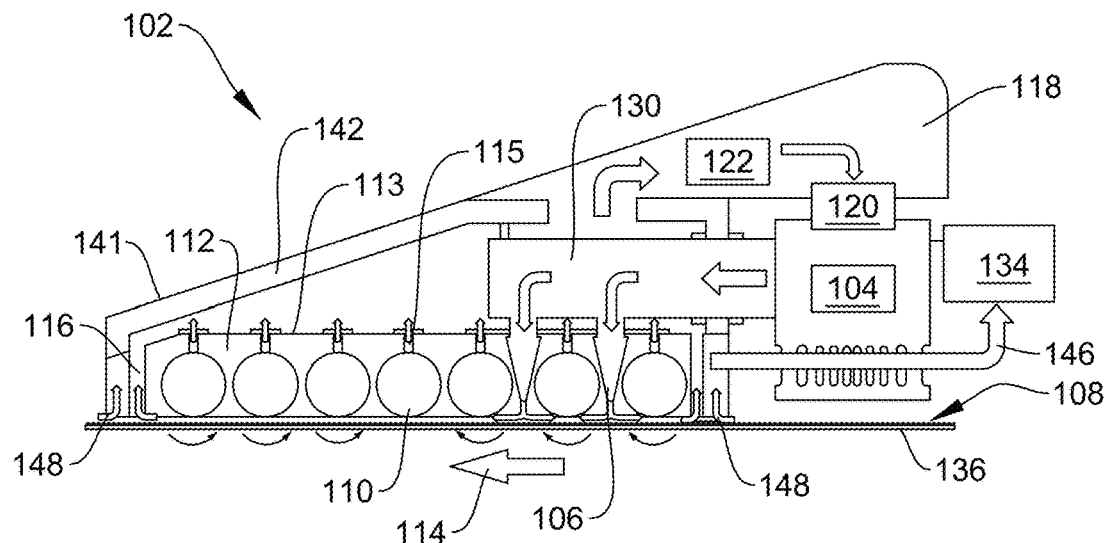
FIG. 2 is a section through an embodiment according to the present disclosure, the section plane being parallel to the direction of travel of a receiving surface.

It should be made clear that the coating apparatus of the present disclosure, an embodiment of which is the apparatus 102 shown in FIG. 2, is not restricted to coating a donor surface of a thermal printing system. A donor surface is only an example of a receiving surface that may be coated using the coating apparatus. While the terms imaging surface and donor surface are typically associated with more complex apparatuses or systems including a coating apparatus having a receiving surface, for simplicity and unless otherwise clear from context, the terms concerning the surfaces to which particles may be applied or from which they may be transferred can be used interchangeably in the following.

The coating apparatus 102 shown in FIG. 2 overlies the donor surface 108, the direction of movement of the donor surface 108 being indicated by an arrow 114. The coating apparatus comprises an air blower 104, serving as a source of pressurized air and supplying nozzles 106 with air (under pressure) carrying a suspension of particles, typically dry. The source of pressurized air, which for simplicity can also be referred to as the air source, can alternatively be a device including compressed air. While being referred to as an air source, 104 can in fact serve to generate and/or maintain the air stream confined in the coating apparatus and mainly recirculating therein. The "air source" terminology is not intended to imply that only fresh air devoid of particles is fed to the coating apparatus, but that the particles can gain or retain any desirable velocity. While not fully hermetic, the coating apparatus can be considered as a relatively closed system with a controlled volume.

The particles carried in the air circulation loop to be later detailed may be made of any suitable material and, by way of example, may be thermoplastic particles (i.e. comprising or consisting of a thermoplastic polymer), if they are to be rendered tacky by heating. The nozzles can extend across the entire width of the receiving/donor surface and may therefore also be regarded as air knives.

Figure 8:
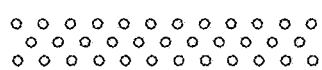
FIG. 8 shows a partial view of a brush with individual bristles that are arranged in staggered rows.
Figure 9:
FIG. 9 is a view similar to that of FIG. 8 showing a brush with tufts of bristles arranged in staggered rows.

The nozzles 106 spray air and suspended particles onto the donor surface 108 to form a particle coating on the donor surface 108. A plurality of rotating brushes 110 can ensure that particles are brought into contact with every part of the donor surface 108 having entered the coating apparatus and that surplus particles are swept off the donor surface 108, to leave substantially only one layer of particles adhering to it. The brushes may have individual bristles, as shown in FIG. 8, or groups or tufts of bristles, as shown in FIG. 9, arranged, for instance, in staggered rows. Each brush may optionally be associated with a brush cleaner 115 that may reduce the amounts of particles that may accumulate on the bristles with time (e.g., by shaking or scraping them off by contact). The brushes are contained within an application chamber 112 that is bounded by a partition 113 that separates the application chamber 112 from a conduit 116. The conduit 116 leads to a chamber 118 and constitutes with the chamber 118 a return path that returns the air and unused particles back to the intake of the blower 104 to maintain a desired flow rate. In this way, an air circulation loop is formed for recycling particles not applied to the donor surface 108. Typically, the flow rate of the air recirculating in the circulation loop is higher than the relative speed of the receiving surface, so that any portion of the surface would be exposed to more than one air cycle before exiting the coating apparatus. Without wishing to be bound by any particular theory, it is believed that this relatively higher flow rate of the air propelling the particles in the circulation loop facilitates the formation of a complete (e.g., without voids) layer of particles during transit of the receiving surface through the coating apparatus.

Particles applied to the donor surface 108 cause the concentration, or density, of the particles in the circulation loop to decrease. It is therefore necessary to replenish the particles from a tank (not shown) by means of a dosing device 120 regulated by means of an electronic controller (not shown). The dosing device 120 should be capable of introducing metered quantities of particles into the air circulation loop, because if the particle concentration is too low, then the donor surface 108 may not be fully coated with particles. Conversely, if the concentration of particles is too high, it would be difficult to ensure that only an even layer of particles is applied to the donor surface 108. Moreover, too high a concentration of particles may lead to a safety or health hazard (e.g., the concentration exceeding the Lower Explosive Limit (LEL) of the particles). It is therefore vital to maintain the concentration of particles within a predetermined range to ensure safe, uniform and efficient coating of the donor surface 108. The predetermined range (or limits of the range) may depend upon the intended use of the coating apparatus or of a system implementing it, the rate of depletion of the particles from the receiving surface, the extent of loss of particles to the walls of the coating apparatus or to any part thereof (e.g., on the brush bristles or on a filtering system of its recirculation loop) and like considerations. Hence, the predetermined limits desirable for any particular case can be readily ascertained by a person skilled in the use of such apparatus. If the coating apparatus and the layer of particles formed thereby are used, for instance, in a printing system and if it is not always the same image that is to be printed, the dosing device 120 cannot be controlled to meter particles at a fixed rate and instead the dosing rate needs to be matched to the density of the image to be printed. In digital printing systems the images to be printed can differ from one image to a subsequent one or from one print job (printing a same first image) to a subsequent print job (printing a same second image). Such changes, which can be rapid and/or frequent, may challenge coating apparatuses to be implemented therein.

Simply put, the dosing device serves to add in the air circulation loop a controlled quantity of new/fresh particles to the particles unbound to the receiving surface in a previous cycle of the recirculating air stream, replacing at least part of the depleted particles. As mentioned, the particles can be depleted "intentionally" in view of their removal from the receiving surface to serve their intended purpose, or inadvertently in view of losses to walls and parts of the coating apparatus.

In FIG. 2, the dosing device 120 is depicted downstream of a sensor of particle concentration 122 and upstream of an air source 104 promoting the recirculation of particles unbound to the receiving surface 108 in the air circulation loop. In its illustrated location, the dosing device may mask, on a back plane, components of the coating apparatus allowing the circulation of the air stream and particles therein, or any device associated with a desired treatment of the foregoing.

For instance, while not shown in the figure, the particles may optionally be fed to the dosing device via one or more preliminary treatment devices designed to at least partially remove (e.g., filter out) and/or to at least partially reduce in size the agglomerates such particles may form, so that smaller agglomerates, smaller clusters or even individual particles can be entrained by the air circulation loop following the dosing device. Similarly, the recirculating air (including the particles therein) may be "treated" to control its temperature, its relative humidity, and/or its electrostatic charge.

To regulate the rate at which particles are metered by the dosing device 120, its controller may receive a signal from a particle density sensor. While it would be possible to use other forms of such sensors (e.g., an electrostatic sensor), the embodiment described in FIG. 2 employs an optical density sensor (ODS) 122 situated in the air circulation loop to monitor the concentration of particles. To improve the accuracy of the particle density sensor (e.g., ODS 122), its detecting part is desirably positioned in a region when the air flow is less turbulent, such as immediately preceding the dosing device 120.

Figure 3:
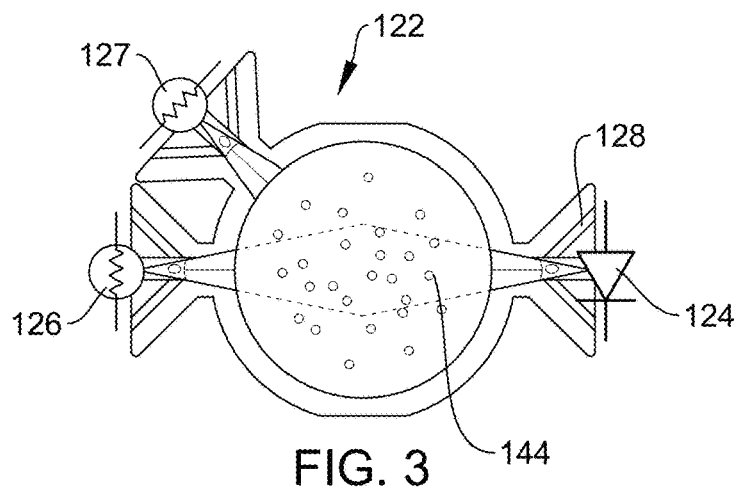
FIG. 3 is an optical density sensor that may be used in the embodiment of FIG. 2.
Figure 4:
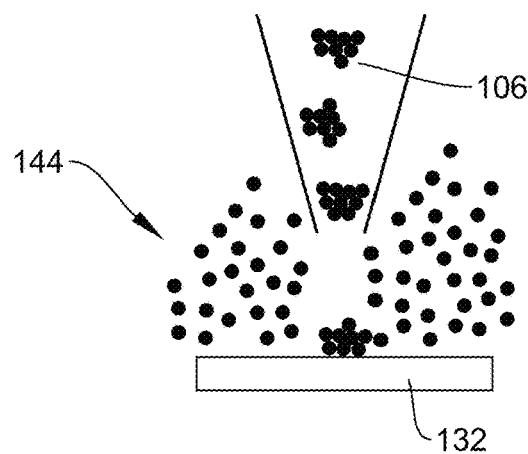
FIG. 4 is a schematic representation of a nozzle spraying particles onto a particle deflector.

The design of a suitable optical density sensor is schematically illustrated in FIG. 3. The detecting part of the sensor comprises a light source, in the form of a light-emitting diode (LED) 124, that emits white light, and a light sensing element, for example in the form of a photoresistor 126. When particles 144 flow through the sensor 122 and in between the LED 124 and the photoresistor 126, the signal output from the photoresistor 126 decreases. The more light that is blocked, the lower the output signal. The sensor 122 is shown as having a second light sensing element, in the form of a second photoresistor 127, to measure scattered light, instead of transmitted light. The scattered light sensing photoresistor 127 also generates an output signal but, unlike the output of the photoresistor 126, it increases with particle density. As the output signals of the two photoresistors 126, 127 are complementary, only one of them is needed. When both are present, the output signal of the scattered light 127 sensor may be used to validate the output from the photoresistor 126 or combined with it to improve the signal to noise ratio. The sum of the output signals of the two photoresistors may be used to check operation and cleanliness of the sensor, because if both the photoresistor 126 and the scattered light sensor 127 have a low reading, this would indicate probable fouling of the LED 124 and/or the photoresistors 126, 127. It is noted that while the particles are for simplicity illustrated in the figure by circles suggesting globular particles, they may assume any other shape and the present coating apparatus and method are applicable to particles also having non-spherical shapes, such as flakes, rods, irregular or amorphous chunks etc.

To reduce deposition of particles on the light source 124 or light sensing element(s) 126, 127, the sensor 122 may have air channels 128 leading to each of its three elements for keeping them clean. Air may either be blown into the channels 128 or, if the sensor 122 is located in a region of the recirculation path under negative pressure, ambient air may be sucked through the channels 128. The output signals of the light sensing elements (e.g., of the photoresistors) can then be used by a controller to adjust the quantity of particles 144 metered into the air circulation loop by the dosing device 120.

As an alternative to regulating the dosing device 120 in dependence upon a direct measurement of the particle concentration in the application chamber of the air recirculation loop, it may do so in a printing system based upon the measured or predicted consumption of the particles. The particle consumption can be measured by analysis of the output signal of an optical device, such as a camera or an optical density scanner, viewing the printed output of the printing system, or it may be predicted by analysis of the input signal applied to the printing system. The two methods of regulating the dosing device, which can be viewed as a "feed-back" and a "feed-forward" control, need not be mutually exclusive and can be combined to further reduce any time delay in the implementation of a modification in the feeding of particles achieved by the dosing device.

Feedback assessment of particle consumption typically includes measuring the optical density (OD) of a printed image. Optical density of various points of a printed image can be measured by using a densitometer or scanning densitometer during the printing process. Optical density measurements are performed by illuminating the printed image with a light source and measuring the intensity of the light reflected from the image. The OD measurements can be made ahead of printing a desired image, using a reference calibration image (e.g., 100% coverage "solid patch" color), or can be done on the intended desired image of each print job, the purpose of the controller being to set the dosing device so that the measured OD matches the intended target OD of the image. A conventional proportional-integral-derivative (PID) controller can be used for relatively long print jobs during which the printing process remains relatively constant. But other controllers, more able to account for changes in operating conditions of the press can be suitable. Such controllers, adapted to maintain the particle concentration in the application chamber within predetermined limits, are known to persons skilled in the field of printing, in particular in control of digital printing processes, and shall not be further detailed herein.

Feedforward prediction of particles consumption can be based on the analysis of the image intended for printing during a particular print job. Controllers adapted for such preemptive methods adapted to maintain the particle concentration in the application chamber within predetermined limits are known in the printing industry and need not be further detailed herein.

A control system can combine predictive regulation of the dosing device, which provides for initial settings, and feedback adjustments, as necessary to compensate for actual deviations from prediction.

Figure 12:
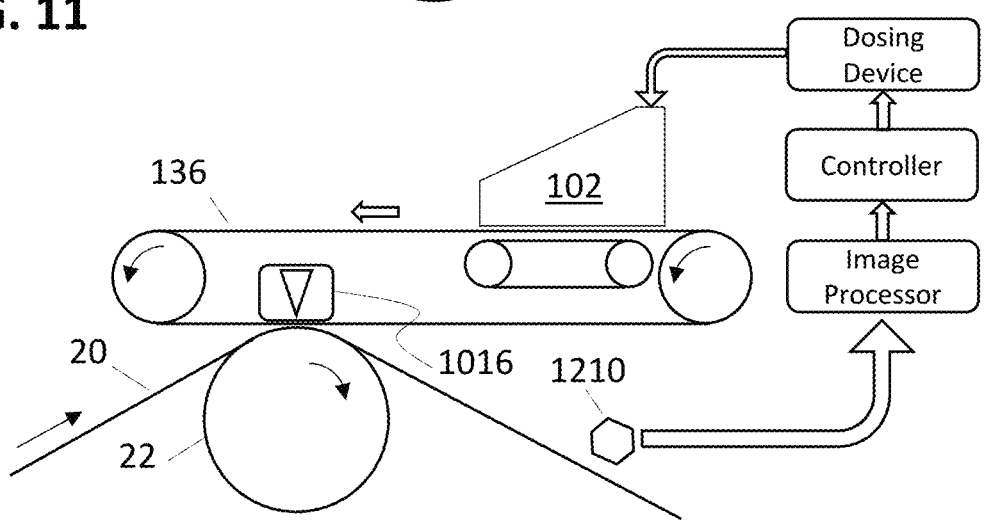
FIG. 12 shows an offset printing system incorporating a coating apparatus according to the present teachings, a process for controlling the coating apparatus being schematically illustrated.

With respect to aforesaid control of a dosing device, it is to be noted that a printing system implementing a coating apparatus according to the present teachings can be considered more buffered than presses relying for instance on ink jetting. While an excess deposition of ink, or conversely an insufficient jetting, may readily translate into a deficient print quality, a coating apparatus typically includes in its air circulation loop an amount of particles not only sufficient to form or replenish a monolayer, but also capable of readily adapting for an increased consumption of particles, the particles in such excess not being wasted on the printing substrate, but recycled until needed for transfer. This render the print quality that can be obtained using a present coating apparatus less dependent upon immediate changes in operating conditions, the waste of ink being also reduced. One exemplary method for controlling the present coating apparatus 102 is schematically depicted in FIG. 12, in which for clarity the dosing device is represented by a box external to the coating apparatus and the air circulation loop is not shown. Numeral 1210 represents an optical device which may provide data enabling, alone or in combination with other sensors and processors, the regulation of the coating apparatus.

A reader interested in gaining more details on such offset printing systems comprising an intermediate transfer member (ITM), a coating apparatus for applying a layer of particles to the ITM, an imaging station for applying energy to selected particles on the ITM to render the particles transferrable to a substrate, and an impression station at which only particles to which energy is applied in the imaging station are transferred from the ITM to a substrate to form an image on the substrate, wherein a coating apparatus according to the present teachings can be advantageously implemented is referred inter alia to WO2016/189512, WO2018/100412, WO2018/100528, WO2018/100530, or WO2019/234597 of the same Applicant.

As best seen in FIG. 2, the air blower 104 may comprise a chamber that houses a large fan configured to output a high volume of air and particle mixture at a low pressure. The fan blows the particles 144 (both those already present in the recirculation loop and the new particles from the dosing device 120), through a feeding chamber 130 that leads to the nozzles 106 in the application chamber 112.

The particles 144 may, in some circumstances, attract and adhere to one another, thereby creating larger, agglomerated particles or clusters. This is a problem encountered when the particles are very small (e.g., have a diameter of no more than a few microns) or when they are damp. If an air stream containing such agglomerated particles is applied directly to the donor surface 108, it may result in an uneven coating.

While not wishing to be bound by theory, it is believed that, if there are relatively larger particles (e.g., agglomerates or clusters) being applied to the donor surface 108, then the brushes 110 may either remove them more easily than the relatively smaller particles, causing holes or discontinuities in the particle coating, or if the brushes do not remove the larger clusters then they may be considered multilayer due to the agglomeration of smaller individual particles. In addition, as time goes by, larger particles tend to be replaced by smaller particles causing a variation in the effect such particles (or the change in particle size distribution) may provide to intended product. Reverting for illustration to the use of the layer of particles or coating apparatus applying them in a printing system, a change in the distribution of the size of the particles in the population applied to the donor surface, may in turn affect the appearance of the printed matter. For instance, variations in the applied population of particles may alter the optical density or the glossiness of a printed image (this being dependent on layer height/thickness which is itself dependent on mean particle size).

With a view to addressing this problem, to the extent that it may occur with the particles one seeks to apply and/or with their size distribution, FIG. 4 shows a particle deflector 132 positioned under the nozzle 106. The particle deflector 132 may be manufactured from any material that is sufficiently hard to break up the agglomerated particles into smaller particles 144 better suited for the intended use (e.g., printing). The smaller particles may be individual particles or may be smaller aggregates of particles. One example of a material suitable for a deflector would be a steel alloy. The particle deflector may have any shape capable of yielding smaller particles and of largely redirecting the air stream. The use of the particle deflector 132 causes a cloud of smaller particles 144 in the application chamber 112 to settle predominantly on the rotating brushes 110 but also on the donor surface 108. The application of a cloud rather than jetting particles 144 straight onto the donor surface 108 results inter alia in one or more of: a narrowing of the distribution of particle size, the formation of a coating of particles being more uniform than in the absence of a deflector, the brushes more effectively removing excess particles 144 from the donor surface 108 and the reduction, delaying or prevention of damage that some particles may cause to the donor surface upon impact. For instance, particles made of a material having a bulk hardness greater than the surface of the transfer member may scratch it even at relatively low impact force, while relatively high impact force may render any particle abrasive to the donor surface.

As the population of particles may be narrowed in its size distribution by the breaking up of agglomerated particles and as the constant recycling of particles in operation of the coating apparatus may prevent re-agglomeration and/or provide at least a partial size reducing effect, it is believed that the deflector can reduce the occurrence of size variations observed over time in its absence, hence decreasing or eliminating any secondary effect such variations may have on the end-product (e.g., disparity in optical density or gloss inconsistency in printed matter).

In a series of experiments run under similar conditions, except for the absence or presence of a deflector in the path of the particles circulating along the air flow, the presence of a deflector dramatically decreased the proportion of aggregates on the donor surface, such aggregates yielding patches of "multilayers" in a mosaic of smaller particles which form the monolayer (as assessed by microscopy and image analysis). The reduction in the amount of relatively larger particles being applied resulted in turn in fewer voids being formed in the applied particle coating following removal of surplus particles. Such effects evolve with the number of cycles but, for illustration, an apparatus that would achieve after 10 cycles about 40% monolayer coating, about 50% multilayer coating and 10% voids in absence of a deflector, might display an improved outcome with a deflector, the relative coverage increasing to above 90% monolayer coating, with a drop both in the amounts of multilayer patches and voids to be each of less than 5% of the coated area.

Regardless of its benefits on the population of particles being applied to the donor surface by a coating apparatus according to the present teachings, the deflector may alternatively or additionally serve to protect the donor surface from any deleterious effect direct application may have to the surface.

The application chamber 112 typically houses multiple brushes 110 or rollers. The brushes 110 positioned nearest to the nozzles 106 apply the particles 144 to the donor surface 108. As seen in FIG. 2, the three brushes 110 furthest to the right and nearest to the nozzles 106 may rotate in a direction to cause bristles to pass over in the same direction as movement of the donor surface. The rotational speed of these brushes 110 can be such that the linear speed of the brushes 110 is greater than the speed of the donor surface 108. For example, the donor surface 108 may travel at 2 m/s, and the linear speed at the radial edge of the brush 110 may travel at 5 m/s, thereby creating a skid of 3 m/s and allowing the bristles of the brushes 110 to wipe particles 144 on to the donor surface 108. While skid speed may need to be adapted to the particles being applied and the donor surface due to be coated thereby, skid between 2 m/s and 5 m/s is deemed suitable for many applications. While a higher skid may improve the efficiency of application and/or removal of particles, it may also increase the risk of wear of the donor surface. Though in the above example the brushes were deemed to have a greater speed than the donor surface, this should not be construed as limiting and alternatively the skid in relative speed can be achieved by the donor surface having a greater speed than the brushes. The skid need not be the same for each brush the donor surface can be contacted by.

The brushes 110 positioned further away from the nozzles 106 may serve the purpose of removing excess particles 144 from the donor surface 108 to leave only a single layer. In FIG. 2, the four brushes 110 on the left represent the particle removing brushes. The particle removing brushes may rotate in a direction to cause bristles to pass over in opposite direction to the movement of the donor surface and at a higher relative speed than the other brushes and may also have a wiper blade (e.g., brush cleaner 115) or equivalent for removing particles 144 from the bristles, thereby cleaning them and making the bristles more effective. In some embodiments, a particle removing brush can be replaced by an air knife or any similar device able to eliminate superfluous particles to that a donor surface on its exit of the coating apparatus is substantially coated by a monolayer of particles.

The above description of the brushes is merely intended as an example. There may be any number of brushes 110 (and indeed nozzles 106) and it will be appreciated that they may rotate in different directions and/or at different relative speeds than those described above. Further, although the brushes 110 described are the same in construction, it should be noted that in some embodiments the brushes may differ to better suit their role. For example, the stiffness and/or the chemical composition of the bristles may vary to suit the task being performed. The nature of the bristle may therefore vary, it being only important to ensure that they do not damage the donor surface while performing their desired task.

In one embodiment, the action of the brushes and their respective bristles can be additionally adjusted by a physical element to further facilitate application of the particles to the donor surface and/or removal of surplus, and/or to further reduce any damage they may cause to the particle coating or to the donor surface. Without wishing to be bound to any particular theory, a bristle can be viewed as contacting an underneath horizontal donor surface or particles thereon with a force comprising a vertical component and a horizontal one, each having a different magnitude along the bristle as it contacts the movable ITM. The vertical force may have such an impact so as to undesirably detach particles loosely attached to the donor surface (e.g., relatively larger ones), whereas the horizontal component of the bristle force provides a gentler swiping effect. The vertical force can be viewed as causing a whipping effect of the bristle. Preferably the horizontal force should be adjusted to be sufficiently high to remove excess particles not directly contacting the donor surface, while being small enough to leave the underlying monolayer of particles contacting the donor surface undisturbed.

Figure 7:
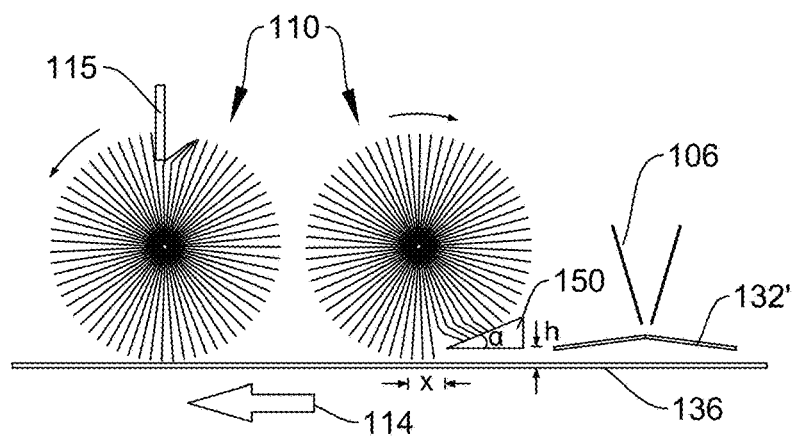
FIG. 7 is a detail of the view of FIG. 2, drawn to an enlarged scale, and showing a nozzle with a particle deflector situated upstream of two brushes each respectively having a brush cleaner and a bristle deflector.
Figure 10:
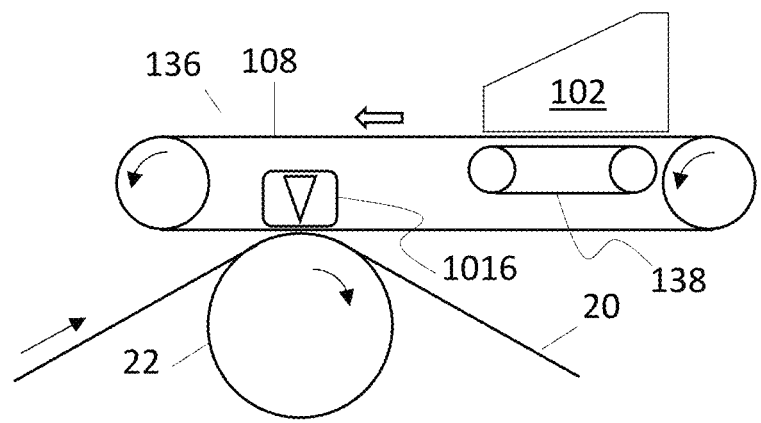
FIG. 10 is a schematic side view of an offset printing system in which a coating apparatus according to one embodiment of the present teachings can be incorporated.

While the vertical force can be modified by selecting a proper distance of the brush from the surface or bristle length and physicochemical properties as previously described, it may also be attenuated by placing a physical obstacle in its path on either side of a point a bristle would have contacted the ITM in absence of such interference. In FIG. 7, one example of such an obstacle is shown in the form of a deflector rod 150 of triangular section, but it may have other cross sections. Such hindrance to the vertical component of a bristle force is termed herein bristle or brush deflector, the element being positioned at a height h above the donor surface, allowing the untouched passage of the particle coating. The bristle or brush deflector forms an angle α with the donor surface on the edge deflecting the bristle, so as to reduce its vertical impact. The edge of the deflector forming an angle with the donor surface is not necessarily exactly underneath the axis of rotation of the brush comprising the bristle but can be at an offset distance X therefrom. A skilled person can readily appreciate how to vary the magnitudes of a, h and X in the bristle deflector (in addition to any other pre-set parameters such as the bristle rigidity and length, and the distance of the brush from the donor surface), to adjust the vertical and horizontal velocities and force of the bristles to suit the intended purpose, operation conditions and the particles being applied to a predetermined ITM. In its simplest form, a brush or bristle deflector can be shaped as a surface tilted with respect to a plane substantially parallel to the donor surface and at a distance (height) h therefrom. The bristle deflector can, for instance, be shaped as a triangle an edge of which following the contour of the donor surface, but this example should not be construed as limiting and all other shapes of deflectors capable of deflecting the bristles so as to satisfactorily modulate the vertical component of their force on the donor surface are encompassed.

Regardless of shape, dimensions and positioning with respect to a prospective point of unaltered contact (e.g., upstream and/or downstream of a point the bristle would have first contacted in absence of the brush deflector), such brush deflector should advantageously be made of a material compatible with the bristles. By compatible, it is meant in this context that the bristle deflector would not damage the bristles due to contact with it, nor be damaged by them, neither physically (e.g., reducing or preventing abrasion, cuts or breakage), nor chemically (e.g., selecting the materials of the bristles and their deflector so as to avoid adverse reactions one with the other), nor in any other way deleterious to the functionality of the brush and its deflector, if present. For instance, the brush deflector should not affect the ability of the bristle to attract, retain and/or donate the particles, as the case may be for different brushes having different roles. By way of example, the brush deflector may be made of a metal or alloy, or be coated with an elastomer, sufficiently hard to bend the impinging bristles, but not excessively harder than the bristles to an extent it would damage them.

The brushes shown in FIG. 2 can be replaced at least in part by a flexible member circulating on two rollers or more, the flexible member having on its outer surface, facing the donor surface, bristles that may act as previously detailed for more conventional brushes wherein the bristles are typically attached to a single more rigid roll. Without wishing to be bound by any particular theory, it is believed that such a bristle-bearing circulating member may replace at least two brushes, while also providing a bristle deflecting effect over a larger corresponding area of the donor surface.

As shown in FIG. 2, the application chamber 112 is partially bounded by the donor surface 108. Any gap that exists between the walls of the application chamber 112 and the donor surface must not allow particles 144 to escape. Aside from the fact that such particles would not be recycled, they could present a health hazard and possibly even a safety risk.

To prevent escape of air and particles from the application chamber 112, it is surrounded by a bell housing 141 that defines a suction chamber 142 that surrounds the application chamber 112 on all sides. As represented by an arrow 146, the suction chamber 142 is connected to a pump and filter unit 134 that lowers the pressure in the suction chamber 142 to below atmospheric pressure and below the pressure in the application chamber 112. Thus, instead of air carrying particles escaping to the ambient atmosphere, it is constantly sucked into the coating apparatus 102 as represented by the arrows 148. In another embodiment, the particles captured by the suction chamber of the bell housing that may accumulate with time on the filter unit can alternatively or additionally be delivered to the dosing device 120, allowing to reintroduce the previously filtered out particles back to the air circulation loop.

Applying a sufficiently low pressure in the suction chamber 142 to ensure that no particles 144 escape could cause the donor surface to be sucked against the bell housing 141. However, it is essential that the donor surface 108 and the bell housing should not contact one another.

The tension in the belt 136 can be used to ensure that no contact takes place with the transversely extending edges of the bell housing 141 as the donor surface 108 enters and leaves the coating apparatus 102, because the belt 136 can be tensioned over rollers at these points. However, the lateral edges of the donor surface 108 cannot be supported in this manner over the entire length of the coating apparatus and, as illustrated in FIG. 5, the low pressure in the suction chamber 142 could cause the lateral edges of the donor surface 108 to flutter and to be drawn into contact with the sides of the bell housing 141 parallel to the direction of movement of the belt/donor surface. This contact may accelerate wear of the donor surface 108 and may cause it to tear, as well as possibly causing damage to the coating apparatus and/or the layer of particles.

In some embodiments, the belt 136 may further comprise, along its lateral edges, protruding formations which are capable of engaging with lateral tracks at least when the belt runs underneath the coating apparatus. Such lateral formations when engaged in respective tracks may place the belt under lateral tension, in at least the region facing the sucking chamber. Such formations may additionally, or alternatively, constrain the belt to follow a desired path in at least a segment of the path corresponding to the coating apparatus or at least its sucking chamber. The lateral formations can be (a) a plurality of formations that are spaced from one another along the length of belt or (b) a continuous formation along the entire length of the lateral edge of the belt, the formations optionally having a thickness greater than the belt. In one embodiment, the formations are (a) made of a material having a low friction coefficient to ensure smooth running of the formations within the lateral tracks and/or (b) made of a material, or comprise an agent, or are coated with a coating having lubricating properties.

However, the belt 136 of which the surface acts as the donor surface 108 cannot in some circumstances be formed of a material having sufficient strength to withstand tensioning to the extent necessary to prevent contact between its lateral edges and the longitudinally extending sides of the bell housing 141. For example, the belt 136 may need to be relatively thin or, in particular embodiments, formed of a transparent material to allow light to pass through it from its rear side before reaching the donor surface 108.

It is possible to prevent the donor surface 108 from being sucked against the housing of the coating apparatus in a variety of ways, such as by providing rollers along the side of the housing. FIGS. 5 and 6 illustrate two of the solutions that are currently preferred.

In FIG. 5, a fibre reinforced silicone blanket 138 serves to provide a support surface for the belt 136 bearing the donor surface. The blanket 138 is moved independently of the belt 136 over a different set of rollers, but the movements of the belt 136 and the blanket 138 are synchronised. The blanket 138 is under sufficient tension and has sufficient stiffness to prevent it from being sucked against the bell housing 141. The movable support surface illustrated by the blanket 138 can be better seen in the side view of FIG. 10 schematically representing an offset printing system in which embodiments of the present coating apparatus can be implemented. Numeral 1016 relates to an imaging station capable of forming an impression station with an impression cylinder 22 aligned therewith, the imaging station being adapted to selectively render tacky particles coated on the receiving surface, to enable their transfer at the nip to a substrate 20.

Figure 5:
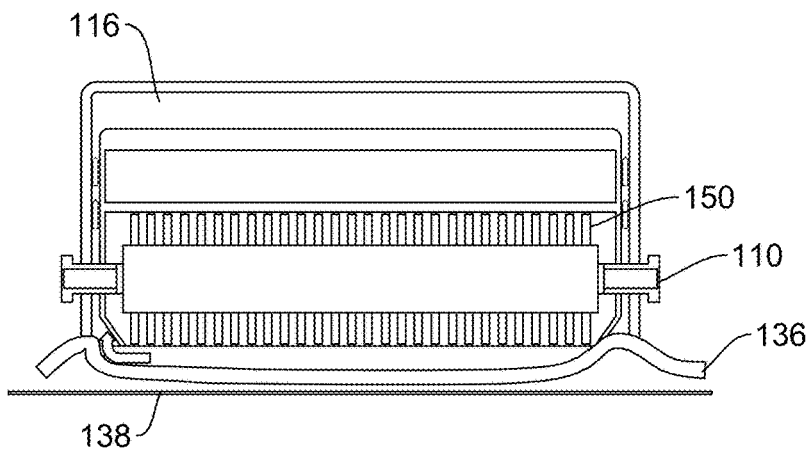
FIG. 5 is a section through the coating apparatus of FIG. 2, perpendicular to the direction of travel of a receiving surface, showing the tendency for the lateral edges of the receiving surface to be deflected due to suction.

The embodiment of FIG. 5 relies on the fact that the blanket 138 and the belt 136 bearing the donor surface 108 will tend to stick to one another, if both are manufactured from a silicone material. This will effectively strengthen the donor surface 108 and prevent it from being sucked against the bell housing 141.

Figure 6:
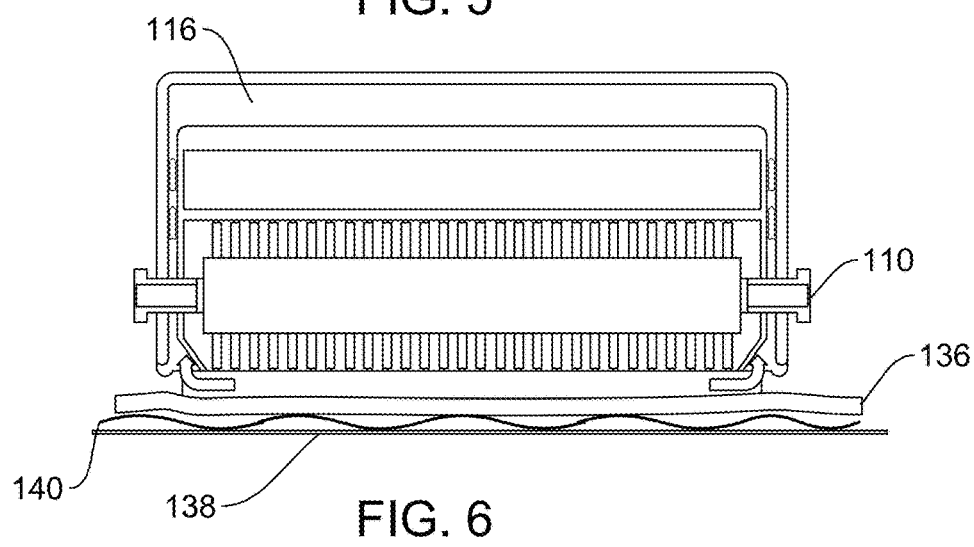
FIG. 6 is view similar to that of FIG. 5 but showing the effect of a liquid layer between the receiving surface and an underlying support surface.
Figure 11:
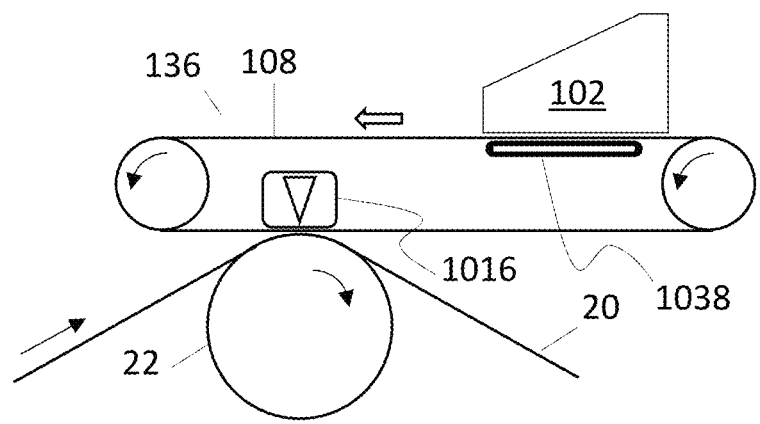
FIG. 11 is a schematic side view of an offset printing system in which a coating apparatus according to another embodiment of the present teachings can be incorporated.

As an alternative to relying on the tendency of surfaces (e.g., made of silicone) to stick to one another, the embodiment of FIG. 6 relies on surface tension. In this embodiment, a liquid (e.g., an oil) film 140 is applied between the belt 136 and the blanket 138 and this serves to prevent the two from separating. As oil is a lubricant, it would be possible to provide a stationary lubricated plate instead of blanket 138, but a recirculating blanket is preferred. A stationary support surface, such as a lubricated plate, is illustrated by numeral 1038 depicted in the side view of FIG. 11 schematically representing an offset printing system in which embodiments of the present coating apparatus can be implemented.

As mentioned previously and shown in FIGS. 8 and 9, the brushes 110 may have rows of individual bristles or groups (tufts) of bristles and the rows may be staggered to ensure that the bristles contact the entire donor surface. A person skilled in manufacturing of brushes can appreciate the parameters that would modulate the density of the bristles on the brush, and more importantly the density of the bristle tips on the outer surface of the brush due to contact the donor surface or particles thereon. While they need not be detailed herein, it is readily understood that the diameter of each bristle, its shape, the number of bristles in a bundle (if any), the distance between the bound end of each bristle or bundle in a row, the distance between adjacent rows, the angle each row may form with the axis of rotation of the brush and like considerations, may affect the density of the bristle tips on the outer surface of the brush. Advantageously, this density should be sufficient for the brush to have a substantially uniform action on the donor surface or particles thereon. By way of converse example, the bristles or rows thereof cannot be distanced from one another in a way that would render areas of the donor surface inaccessible to their tips.

Depending inter alia on their dimensions and the materials from which they are formed, bristles may display a variety of stiffness/flexibility/ability to obtain, retain and/or donate particles which can be selected and adapted to the particles and the donor surface to be coated therewith, and/or to the distance between the axis of rotation of the brush to which the bristles are attached and the donor surface. While the length of a bristle should be sufficient to impinge on the donor surface to apply and/or remove the particles and short enough to avoid damaging the donor surface or particle coating, the extent of this permissible length (which include the physical distance to be bridged by the bristle) may depend on the foregoing considerations as previously detailed.

By way of illustration, all other bristle parameters being similar including the excess length of the bristle that would collide with the donor surface, a relatively longer bristle rotating around an axis more distant from the donor surface would apply less pressure than a relatively shorter one rotating around a less distant axis. While diminished pressure is an advantage as far as the wear of the donor surface is concerned, it might become insufficient to remove surplus particles. Similarly, and all other parameters being similar, a bristle having a relatively larger diameter would apply more pressure than a bristle with a relatively smaller one. This increased pressure is an advantage to remove surplus particles, but can be damaging to the donor surface.

In some embodiments, the bristles are made of a durable natural or synthetic material. Suitable natural materials can be of plant or animal origin, and include by way of example animal hair, fur, down, plume or feather. Synthetic materials may be made to mimic the former examples of natural materials, but can also be plastic materials comprising or consisting, for instance, of nylon. Preferably, the bristles are made of a material able to suitably displace the particles being coated by the apparatus on the donor surface. In other words, the bristles should be able to sufficiently attract/retain the particles, albeit to a lesser extent than the donor surface, to remove surplus, while being capable of releasing them to prevent build-up or any other saturation process rendering them inefficient. As the brushes of the coating apparatus need not be the same, their respective bristles may likewise differ.

The bristles may have any suitable shape and cross-section. In some embodiments, the bristles have a cylindrical shape, the diameter of the bristles being of at least 5 μm, at least 10 μm, or at least 15 μm. In some embodiments, the diameter of the cylindrical bristles is at most 100 μm, at most 75 μm, or at most 50 μm. In further embodiments, the diameter of the cylindrical bristles is between 5 μm and 100 μm, between 10 μm and 75 μm, or between 10 μm and 50 μm. In other embodiments, the cross-section perpendicular to the length of the bristle is not an ideal circle but an ellipse or a polygon, in which case a suitable "diameter of the bristle" can be approximated by the maximal length of the cross section for the upper limits and for the minimal length of the cross section for the lower limits. Taking for example a bristle having a rectangular cross section, its longer side might not exceed, in some embodiments, 100 μm, 75 μm, or 50 μm, while its smaller side might be of at least 5 μm, at least 10 μm, or at least 15 μm.

In some embodiments, the bristles have a total length of at least 7 mm, at least 8 mm, or at least 9 mm. In some embodiments, the total length of the bristles is at most 20 mm, at most 17.5 mm, or at most 15 mm. In further embodiments, the total length is between 7 mm and 20 mm, between 8 mm and 17.5 mm, or between 9 mm and 15 mm.

In some embodiments, the bristles have a total length in excess of the shortest distance between the end of the bristle bound to the brush and the donor surface, the difference between the two values (the excess length) being of at least 200 μm, at least 500 μm, or at least 1 mm. In some embodiments, the excess length of the bristles as compared to the shortest distance is at most 5 mm, at most 4 mm, or at most 3 mm. In further embodiments, the excess length is between 200 μm and 5 mm, between 500 μm and 4 mm, or between 1 mm and 3 mm. While too high an excess length may damage the donor surface, a sufficiently high one may improve the swiping effect of the bristles, in other words may facilitate application of particles and removal of excess not directly contacting the donor surface.

In some embodiments, the bristles are attached to a brush base or any other suitable support as bundles of bristles. Since bundled bristles have a tendency to open out at their tips as compared to their point of attachment at the base, bundles can be characterized by the dimension of their point of attachment. Taking for instance a bundle of bristles being attached to a brush via a cylindrical depression in the brush support, a bundle can be defined by the diameter of the recess in which their bases are inserted and secured to the brush. In such embodiments, bundle diameters of less than 3.0 mm, less than 2.5 mm, or less than 2.0 mm were found suitable.

While, for the sake of illustration, this disclosure has been described in terms of certain embodiments and generally associated methods, alterations and permutations of the embodiments and methods will be apparent to those skilled in the art based upon Applicant's disclosure herein. The present disclosure is to be understood as not limited by the specific embodiments described herein. It is intended to embrace all such alternatives, modifications and variations and to be bound only by the spirit and scope of the disclosure and any change which come within their meaning and range of equivalency.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Unless otherwise stated, the use of the expression "and/or" between the last two members of a list of options for selection indicates that a selection of one or more of the listed options is appropriate and may be made.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

In the disclosure, unless otherwise stated, adjectives such as "substantially", "approximately" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the terms "about" and "approximately" precede a numerical value, it is intended to indicate +/−15%, or +/−10%, or even only +/−5%, and in some instances the precise value. Furthermore, unless otherwise stated, the terms (e.g., numbers) used in this disclosure, even without such adjectives, should be construed as having tolerances which may depart from the precise meaning of the relevant term but would enable the invention as herein disclosed and non-limitatively exemplified, or the relevant portion thereof, to operate and function as described, and as understood by a person skilled in the art.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise. At least one of A and B is intended to mean either A or B, and may mean, in some embodiments, A and B.

Positional or motional terms such as "upper", "lower", "right", "left", "bottom", "below", "lowered", "low", "top", "above", "elevated", "high", "vertical", "horizontal", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, when the outer bounds of a range with respect to a feature of an embodiment of the present technology are noted in the disclosure, it should be understood that in the embodiment, the possible values of the feature may include the noted outer bounds as well as values in between the noted outer bounds.

To the extent necessary to understand or complete the disclosure of the present disclosure, all publications, patents, and patent applications mentioned herein, including in particular the applications of the Applicant, are expressly incorporated by reference in their entirety by reference as is fully set forth herein.

The invention claimed is:

1. A coating apparatus for applying a layer of particles to a receiving surface, the apparatus comprising:
   a) an application chamber partially bounded by the receiving surface;
   b) a source of pressurized air in fluid coupling with the application chamber;
   c) an air return path forming fluid communication between the application chamber and an intake of the air source, the return path forming a portion of an air circulation loop;
   d) at least one nozzle disposed in the air circulation loop downstream from the source of pressurized air and disposed within the application chamber in a manner which will cause air supplied by the source of pressurized air to pass through the nozzle and exit therefrom as an air stream;
   e) a dosing device coupled to a source of particles to be coated onto the receiving surface and capable of controllably introducing particles into the air circulation loop; and,
   f) a particle deflector disposed in the path of the air stream exiting the nozzle such that particles carried by the air stream impact the deflector prior to contact being made between the particles and the receiving surface.

2. A coating apparatus as claimed in claim 1, further comprising brushes disposed in the application chamber downstream from the at least one nozzle, each brush having bristles capable of brushing the receiving surface, the bristles and the receiving surface being in relative movement one with the other, the brushes configured to operationally leave only a single layer of particles adhering to the receiving surface.

3. A coating apparatus as claimed in claim 2, wherein a first part of the brushes comprises at least one first brush that lies adjacent to a respective at least one nozzle and the at least one first brush being configured to rotate in a direction to cause the bristles thereof to pass over the receiving surface in a same direction as the movement of the receiving surface.

4. A coating apparatus as claimed in claim 2, wherein a second part of the brushes comprising at least one second brush disposed downstream from the first part and remote from the nozzles.

5. A coating apparatus as claimed in claim 4, wherein the at least one second brush being configured to rotate in a direction to cause the bristles thereof to pass over the receiving surface in a direction opposite to the movement of the receiving surface.

6. A coating apparatus as claimed in claim 2, further comprising a bristle deflector adjacent at least one of the brushes, the bristle deflector being configured to deflect tips of bristles of a respective brush prior to contact being made between the bristles and the receiving surface.

7. A coating apparatus as claimed in claim 1, wherein the application chamber is surrounded by a bell housing defining a suction chamber to prevent particles from escaping into the ambient atmosphere.

8. A coating apparatus as claimed in claim 1, wherein the receiving surface is a recirculating surface of an endless belt.

9. A coating apparatus as claimed in claim 8, further comprising a support surface disposed adjacent to a portion of a face of the endless belt opposite from the receiving surface, and wherein the support surface is movable with or relative to the endless belt.

10. A coating apparatus as claimed in claim 8, further comprising a support surface disposed adjacent to a portion of a face of the endless belt opposite from the receiving surface, and wherein an oil film is provided between the endless belt and the support surface to cause the belt to adhere to the support surface.

11. A method of applying a layer of particles to a receiving surface, which method comprises:
   i) providing an application chamber partially bounded by the receiving surface,
   ii) utilizing an air source to blow an air stream into the application chamber,
   iii) returning air from the application chamber to an intake of the air source to form an air circulation loop,
   iv) introducing into the air circulation loop particles to be coated onto the receiving surface, and
   v) providing a particle deflector positioned in the path of the air stream, disposed such that particles impact the particle deflector prior to contact being made between the particles and the receiving surface.

12. A method as claimed in claim 11, wherein the air stream is blown by the air source through a nozzle.

13. A method as claimed in claim 11, further comprising providing brushes in the application chamber for brushing the receiving surface to leave only a single layer of particles adhering to the receiving surface, each of the brushes and the receiving surface being in relative movement one with the other.

14. A method as claimed in claim 13, wherein a brush deflector is provided adjacent at least one of the brushes to deflect tips of bristles of the brush prior to contact being made between the bristles and the receiving surface.

15. An offset printing system comprising an intermediate transfer member (ITM), a coating apparatus for applying a layer of particles to the ITM, an imaging station for rendering the particles transferrable to a substrate, and an impression station at which only particles rendered transferrable by the imaging station are transferred from the ITM to a substrate to form an image on the substrate, wherein the coating apparatus comprises:
   a) an application chamber partially bounded by the receiving surface;
   b) a source of pressurized air in fluid coupling with the application chamber;
   c) an air return path forming fluid communication between the application chamber and an intake of the air source, the return path forming a portion of an air circulation loop;
   d) at least one nozzle disposed in the air circulation loop downstream from the source of pressurized air and disposed within the application chamber in a manner which will cause air supplied by the source of pressurized air to pass through the nozzle and exit therefrom as an air stream;
   e) a dosing device coupled to a source of particles to be coated onto the receiving surface and capable of controllably introducing particles into the air circulation loop; and,
   f) a particle deflector disposed in the path of the air stream exiting the nozzle such that particles carried by the air stream impact the deflector prior to contact being made between the particles and the receiving surface.

16. An offset printing system as claimed in claim 15, wherein the imaging station applies energy to selected particles on the ITM and the particles to which energy is applied are transferred.

17. An offset printing system as claimed in claim 16, wherein the applied energy is in the form of electromagnetic (EM) radiation applicable from a front side or a rear side of the ITM or in the form of heat conduction applicable through the ITM.

18. An offset printing system as claimed in claim 15, wherein the imaging station modifies selected regions of the substrate upstream of the impression station and particles in regions corresponding on the ITM to the selected regions are transferred.

19. An offset printing system as claimed in claim 15, wherein the particles are thermoplastic particles.

* * * * *